United States Patent Office 3,637,538
Patented Jan. 25, 1972

3,637,538
FOAMABLE STYRENE POLYMER RESINS
Charles Robert Heald, Newport, England, assignor to Monsanto Chemicals Limited, London, England
No Drawing. Filed June 13, 1968, Ser. No. 736,567
Claims priority, application Great Britain, July 7, 1967, 31,349/67
Int. Cl. C08f 33/02, 47/10
U.S. Cl. 260—2.5 B
8 Claims

ABSTRACT OF THE DISCLOSURE

Foamable resin particles comprising a monovinylidene aromatic polymer, a volatile blowing agent, and an amide having a melting point in the range of 35–115° C. and corresponding to the general formula RCONHR' wherein R is an aliphatic hydrocarbon radical containing 10–24 carbon atoms and R' is hydrogen or an alkyl radical containing 1–3 carbon atoms; and processes for preparing foamed articles by steam-heating the foamable resin particles to form a prefoam and subsequently treating the prefoam with steam in a mold.

BACKGROUND OF THE INVENTION

Field of the invention

This invention relates to foamable monovinylidene aromatic polymers and more particularly relates to foamable particles of a monovinylidene aromatic polymer containing an additive which improves the fusion properties of the particles.

Description of the prior art

Foamed monovinylidene aromatic polymers, e.g., foamed polystyrene, are important industrial commodities, particularly in the form of boxes, other packages, or blocks that are cut into boards or other shapes. One method by which foamed polystyrene articles are commonly produced is a process wherein foamable particles consisting essentially of polystyrene and a volatile blowing agent are expanded by the action of heat to form a prefoam of foamed beads, the prefoamed beads are subsequently placed in a suitable mold in which they are expanded and consolidated by steam-heating to form an article conforming to the shape of the mold, and the article is then allowed to cool so that it can be removed from the mold without becoming distorted, e.g., bulged.

The degree to which consolidation takes place in the molding operation is partly dependent on the pressure of the steam and the duration of the steam-heating, and consequently on the quantity of steam used. In practice, the cost of steam used in the molding operation represents a significant proportion of the cost of the process as a whole, and it would be desirable to reduce steam consumption if this could be done without significantly impairing the consolidation and hence the properties of the final molded article.

It would also be desirable to reduce the time required to cool the molded article before it can be removed from the mold, since, as observed in S. J. Skinner et al., "How Polystyrene Foam Expands," Modern Plastics, 42, No. 5, pp. 171–178 (January 1965), a reduction in the required cooling time improves the economics of the process and can result in the formation of products having a more uniform density distribution.

An object of the invention is to provide novel foamable particles of a monovinylidene aromatic polymer.

Another object is to provide such particles containing an additive which improves the fusion properties of the particles.

A further object is to provide such particles which require less steam for a given degree of consolidation than similar particles not containing the additive.

A still further object is to provide such particles, the shaped articles molded from which require a shorter cooling time than shaped articles molded from similar particles not containing the additive.

An additional object is to provide a process for molding such particles.

SUMMARY OF THE INVENTION

These and other objects are attained by (1) incorporating in foamable resin particles comprising a monovinylidene aromatic polymer and a volatile blowing agent, an amide having a melting point in the range of 35–115° C. and corresponding to the general formula RCONHR' wherein R is an aliphatic hydrocarbon radical containing 10–24 carbon atoms and R' is hydrogen or an alkyl radical containing 1–3 carbon atoms and (2) producing a molded foamed article by steam-heating the amide-containing foamable resin particles to form a prefoam of foamed particles, treating the prefoam with steam in a mold to form a shaped article, and allowing the shaped article to cool before removing it from the mold.

DESCRIPTION OF THE PREFERRED EMBODIMENTS

The following examples are given to illustrate the invention and are not intended as a limitation thereof. Unless otherwise specified, quantities mentioned are quantities by weight.

EXAMPLE I

Part A.—Control

Tumble 100 parts of foamable polystyrene particles having an average diameter of 0.7 mm. and containing a pentane blowing agent in a conical blender with 0.5 part of a solution of 20% of a commercial sorbitan monopalmitate in equal parts by volume of methylated spirit and hexane. Dry the wet particles in a current of air to form particles coated with 0.1% of the sorbitan monopalmitate. Prefoam the coated particles in a continuous prefoaming apparatus, allow them to dry on an open tray for one day, and mold the prefoamed particles into a small rectangular box having perforated walls by (1) charging a suitable mold with an amount of prefoamed beads sufficient to fill the mold and (2) injecting steam through a number of holes in the walls of the mold to give a pressure of about 14 p.s.i.g. for one minute. Allow the molding to cool, and remove it from the mold as soon as the mold can be opened without causing the molding to bulge.

The molding is a foamed polystyrene box having a density of about 1.5 pounds per cubic foot. Store it for one day, and then note its strength and degree of consolidation. The results are shown in the table.

Part B.—Control

Repeat Part A except for using a steam pressure of 18 p.s.i.g. in the molding operation. The product is a foamed polystyrene box having a density of about 1.5 pounds per cubic foot. The strength and degree of consolidation noted after storage for one day are shown in the table.

Part C

Repeat Part A except for using 0.5 part of a solution of 10% of oleamide and 20% of the commercial sorbitan monopalmitate in equal parts by volume of methylated spirit and hexane to coat the foamable polystyrene particles. When dried, the particles are coated with 0.05% of oleamide and 0.1% of the sorbitan monopalmitate. The molded product is a foamed polystyrene box having a density of about 1.5 pounds per cubic foot. The strength and degree of consolidation noted after storage for one day are shown in the table below.

Part D

Repeat Part C except for using a steam pressure of 18 p.s.i.g. in the molding operation. The product is a foamed polystyrene box having a density of about 1.5 pounds per cubic foot. The strength and degree of consolidation noted after storage for one day are shown in the table below.

TABLE

| Product: | Oleamide (percent) | Steam pressure (p.s.i.g.) | Consolidation and strength |
|---|---|---|---|
| A | 0 | 14 | Poor. |
| B | 0 | 18 | Good. |
| C | 0.05 | 14 | Do. |
| D | 0.05 | 18 | Excellent. |

As demonstrated above, the use of oleamide to coat foamable polystyrene particles leads to the production of a foamed polystyrene of good quality even when reduced steam pressure is used, and it leads to the production of a foamed polystyrene having improved strength and consolidation when normal steaming conditions are used. Similar results are observed when:

(1) The foamable particles are particles of a styrene-acrylonitrile (80:20) copolymer, a styrene-methyl methacrylate (90:10) copolymer, a styrene-alpha-methylstyrene-acrylonitrile (85:5:10) terpolymer, or a toughened polystyrene containing 5% of a polybutadiene rubber, and (2) The amide is capramide, lauramide, palmitamide, stearamide, undecyleneamide, linoleamide, linolenamide, erucamide, or the N-methyl, N-ethyl, N-propyl, or N-isopropyl derivatives thereof.

EXAMPLE II

Repeat Example I except for injecting the steam into the mold for only 20 seconds instead of one minute. A similar gradation in properties of the resultant boxes is observed.

EXAMPLE III

Part A.—Control

Prefoam foamable polystyrene particles having an average diameter of 1.1 mm. and containing a pentane blowing agent in a contiuous prefoaming apparatus, allow them to dry on an open tray for one day, and mold the prefoamed particles into a block by (1) charging a mold having the form of a one foot cube with an amount of preformed beads sufficient to fill the mold and (2) injecting steam through a number of holes in the walls of the mold to give a pressure of about 14 p.s.i.g. for one minute. Allow the block to cool, and remove it from the mold as soon as the mold can be opened without causing the block to bulge. A cooling time of 30 minutes is required.

The block has a density of about 1.5 pounds per cubic foot. Cut it into boards having a thickness of one inch, and note the flexural strength of the boards and the degree of consolidation of the beads.

Part B

Repeat Part A except for tumbling 100 parts of the foamable polystyrene particles in a conical blender with 0.5 part of a solution of 10% of oleamide in equal parts by volume of methylated spirit and hexane and drying the wet particles in a current of air to form particles coated with 0.05% of oleamide prior to prefoaming the foamable particles. The cooling time required before the block can be removed from the mold is only 21 minutes.

The block has a density of about 1.5 pounds per cubic foot. The boards cut from the block have greater flexural strength than the boards cut from the block of Part A, and the individual beads in the boards are better consolidated than in the boards of Part A.

EXAMPLE IV

Repeat Example III except for employing foamable polystyrene particles having an average diameter of 1.3 mm. and molding under a steam pressure of 8 p.s.i.g. The results are similar to those obtained in Example III except that the blocks have a density of about 1.0 pound per cubic foot.

As previously mentioned, the foamable resin particles of the invention comprise a monovinylidene aromatic polymer, a volatile blowing agent, and a suitable amide. Particularly valuable results are obtained when the monovinylidene aromatic polymer is polystyrene itself, but other monovinylidene aromatic polymers can also be used. Exemplary of such other monovinylidene aromatic polymers are polymers of o-, m-, and p-methylstyrenes, alpha-methylstyrene, and other alkyl-styrenes; copolymers of styrene and/or substituted styrenes with ethylenically unsaturated moomers such as acrylonitrile, methacrylonitrile, butadiene, methyl acrylate, ethyl acrylate, propyl acrylate, butyl acrylate, the corresponding alkyl methacrylates, etc.; toughened polystyrenes, i.e., polystyrenes having physically or chemically combined therewith a minor proportion, e.g., 1–15% by weight, of a natural or synthetic rubber such as a substantially linear or branched polymer of a conjugated 1,3-diene such as butadiene, including copolymers with interpolymerizable monomers such as styrene, acrylonitrile, methyl methacrylate, etc.

The volatile blowing agent is preferably a hydrocarbon blowing agent or some other volatile substance that swells but does not dissolve the monovinylidene aromatic polymer. It can be gaseous or liquid under normal conditions of temperature and pressure, and, in general, it can be any of the volatile blowing agents conventionally used for the expansion of monovinylidene aromatic polymers. A hydrocarbon such as a butane or a pentane is usually preferred, and the blowing agent is most preferably essentially a pentane fraction. Usually the amount of blowing agent employed is such as to constitute up to 10%, e.g., 3–10%, by weight, based on the weight of the polymer. The blowing agent can be incorporated in the polymer particles by any suitable technique, e.g., by steeping the particles in the liquid blowing agent, but it is preferably present during a suspension polymerization process by which the particles are formed and thus becomes absorbed into them.

The foamable particles can be of any shape, but preferably they are roughly spherical and have an average diameter of 0.2–2.5 mm., e.g., 0.5–1.5 mm. Foamable beads that have been made by an aqueous suspension polymerization process are particularly useful.

The amide of the invention is an amide or mixture of amides having a melting point in the range of 35–115° C. and corresponding to the general formula RCONHR' wherein R is an aliphatic hydrocarbon radical containing 10–24 carbon atoms and R' is hydrogen or an alkyl radical containing 1–3 carbon atoms. The aliphatic hydrocarbon radical represented by R can be saturated but is preferably unsaturated. When it is unsaturated, it preferably contains a single olefinic double bond, although two or more such bonds or an acetylenic bond can be present if desired. It can be straight-chained or branched, and preferably a single olefinic bond is present near the middle of the carbon chain. When there is a possibility of geometrical isomerism about a double bond, the configuration is preferably cis. The number of carbon atoms in the radical R is preferably 16–21, and particularly preferred are amides wherein R contains 17 carbon atoms. In the formula R' is preferably hydrogen, but it can be a methyl, ethyl, n-propyl, or isopropyl radical. Preferably the amide has a melting point in the range of 49–80° C., e.g., 60–75° C. Often, particularly when R is a saturated radical, an amide of the given formula has a melting point higher than 115° C., but such an amide can still be employed as a component of a mixture of amides that melts within the required range. Exemplary of amides that can be used, either alone or in admixture, are the simple amides, N-methyl amides, N-ethyl amides, N-propyl amides, and N-isopropyl amides of capric, lauric, palmitic, stearic, undecylenic, oleic, linoleic, linolenic, and erucic acids. Oleamide is particularly useful.

The amide can be incorporated in the foamable resin in any convenient way, but preferably the method is one by means of which a major proportion of the amide used is present as a coating on the surface of the particles. For example, particles of a foamable polymers can be tumbled with an appropriate quantity of the amide in powdered form. Alternatively, the amide can be deposited onto the surface of the polymer particles by evaporation of a solution of the amide with which the particles have been wetted. The solvent employed in such a solution should be sufficiently volatile for it to be capable of evaporation at a reasonable rate, and, of course, it should also not be one that could have a deleterious effect on the foamable resin particles, e.g., by dissolution of the polymer or extraction of the blowing agent, but normally it is not difficult to choose a solvent fulfilling these conditions. Very often a lower alcohol, e.g., methanol, ethanol, etc., or a volatile liquid hydrocarbon, e.g., a pentane, a hexane, a heptane, etc., is most suitable, and a mixture of solvents can be employed if desired. Solutions containing 10–35% by weight of the amide are particularly useful. A method involving the evaporation of a solution of the amide is particularly useful when the amount of amide employed is near the lower end of the ranges mentioned in the following paragraph.

The amount of amide employed is usually not more than 1.0% by weight of the polymer, although larger amounts are sometimes used in cases where, for instance, only a small proportion of the amide is present on the surface of the particles and the remainder is dispersed through the interior of the particles. In general, when a major proportion of the amide is present at the surface of the particles, the amount of amide employed is preferable 0.01–0.5%, e.g., 0.03–0.3%, by weight of the polymer. Usually a relatively higher proportion of amide is desirable when the particles are comparatively small than when they are larger because of the greater surface area of a given weight of small particles. About 0.05% by weight of amide gives good results with approximately spherical particles having an average diameter of about 0.7 mm.

When, as is preferred, the amide is present as a coating on the surface of the particles, the coating can also comprise one or more additional ingredients, e.g., flame-retardant agents, ingredients which reduce any tendency for the prefoam particles to clump together in clusters or form fused lamps during the prefoaming operation, etc. Particularly useful ingredients of the latter kind are the lipophilic surface-active agents described in copending U.S. application S.N. 580,603, filed Sept. 20, 1966, in the names of Brinley Roberts and Robert James Stephenson. A lipophilic surface-active agent has a much greater solubility in organic solvents, e.g., benzene, than in water and normally is substantially insoluble in water. Normally the agent has an "HLB number" (as defined by Griffin in The Journal of the Society of Cosmetic Chemists, 1949, 1, 311–326, and 1954, 5, 249–256) that is less than 10, e.g., from 1.5 or 2 to 9. The agent is preferably non-ionic, e.g., a long chain ester or ether of a polyhydric alcohol such as ethylene glycol, propoylene glycol, sorbitol, sorbitan, or a polycondensate of ethylene oxide. These preferred surface-active agents also contain a long chain of carbon atoms, which needs to be long enough to reduce any tendency toward hydrophilic properties but is preferably not so long as to render the agent insoluble in organic solvents. Generally the chain length is at least 12, preferably 12–18, carbon atoms long. When the agent is an ester, it is preferably a mono-ester and is usually one of a long-chain fatty acid such as lauric, stearic, palmitic, and oleic acids. When the agent is an ether, it can be, e.g., an ether of an appropriate long-chain fatty alcohol such as dodecyl alcohol, etc., or of a long-chain alkylphenyl such as dodecyl phenol, etc. Excellent results are obtained using mono-esters of sorbitan, particularly a palmitate, stearate, or laurate of this alcohol. When employed, the amount of surface-active agent is usually not more than about 0.5% by weight of the polymer, e.g., 0.02–0.3% or 0.05–0.2% by weight. About 0.1% or 0.15% by weight usually gives good results.

In general, the prefoaming operation can follow ordinary practice. Thus, the foamable particles are heated by steam to produce prefoamed particles that are preferably conditioned by exposing them to the atmosphere for a day or two before they are used in the molding operation. In molding, a suitable mold is fully or partially filled with prefoamed particles and closed, and then steam is injected through inlets in the mold walls. The steam pressure or the steaming time can be somewhat less than would be employed normally (i.e., without the amide additive according to the invention) to produce a foamed article having a similar degree of consolidation. It is often found that the steam pressure can be reduced by up to 25%, e.g., 10–20%, of the "normal" pressure. Alternatively, the steaming time can be reduced, often by up to 30%, e.g., 10–25%, of the "normal" times. The steam pressure and the steaming time can be reduced simultaneously if desired, e.g., each can be 90–95% of the "normal" value. Instead of reducing the steam pressure and steaming time, they can be maintained at their "normal" values with an improvement in the degree to which the foamed particles are consolidated together in the molded foamed article. When foaming is complete, the steam supply is shut off, and the article is allowed to cool in the mold before the mold is opened.

The cooling time of a molded article made from foamable resin particles according to the invention is significantly less than the cooling time required when articles are molded from similar foamable resin particles which do not contain the amide additive of the invention. In any particular instance the cooling time of a molded article depends to a certain extent on its size, but it is often found that the cooling time is 50–80%, e.g., 60–70%, of the "normal" cooling time. This reduction in cooling time is particularly advantageous when a large article, e.g., a block, is produced from foamable beads having a comparatively large diameter, e.g., up to 2 mm. in diameter.

It is obvious that many variations can be made in the products and processes set forth above without departing from the spirit and scope of this invention.

What is claimed is:

1. In combination with foamable resin particles of a styrene polymer, a volatile blowing agent and a lipophilic surface-active agent, the improvement which comprises an amide having a melting point in the range of 35–115° C. and corresponding to the general formula RCONHR' wherein R is an aliphatic hydrocarbon radical containing 10–24 carbon atoms and R' is a hydrogen or alkyl radical containing 1–3 carbon atoms.

2. The particles of claim 1 wherein R is an aliphatic hydrocarbon radical containing a single olefinic double bond.

3. The particles of claim 1 wherein R is an aliphatic hydrocarbon radical containing 16–21 carbon atoms.

4. The particles of claim 1 wherein R is an aliphatic hydrocarbon radical containing 17 carbon atoms.

5. The particles of claim 1 wherein R' is hydrogen.

6. The particles of claim 1 wherein the amide is oleamide.

7. The particles of claim 1 wherein the amide and the lipophilic surface-active agent are present as a coating on the surface of the particles.

8. In a process for producing a foamed monovinylidene aromatic polymer articles by (1) steam-heating foamable resin particles comprising a monovinylidene aromatic polymer, a volatile blowing agent and a lipophilic surface-active agent to form a prefoam of foamed particles, (2) treating the prefoam with steam in a mold to form a shaped article, and (3) allowing the shaped article to cool before removing it from the mold, the improvement which comprises incorporating in the foamable resin particles, prior to steam-heating, an amide having a melting point in the range of 35–115° C. and the corresponding to the general formula RCONHR' wherein R is an aliphatic hydrocarbon radical containing 10–24 carbon atoms and R' is hydrogen or an alkyl radical containing 1–3 carbon atoms.

References Cited
UNITED STATES PATENTS

| | | | |
|---|---|---|---|
| 3,480,570 | 11/1969 | Roberts et al. | 260—2.5 B |
| 3,389,097 | 6/1968 | Ingram et al. | 260—2.5 B |
| 3,429,737 | 2/1969 | Marsden | 260—2.5 B |

MURRAY TILLMAN, Primary Examiner

W. J. BRIGGS, Sr., Assistant Examiner

U.S. Cl. X.R.

260—2.5 R, 23 S, 33.6 UA, 93.5 A; 264—53, 55